United States Patent [19]

Nakashima et al.

[11] Patent Number: 5,333,061
[45] Date of Patent: Jul. 26, 1994

[54] METHOD AND APPARATUS FOR PRODUCING AN INSTRUCTIONAL VIDEO ANALYZING A GOLF SWING

[75] Inventors: Shinji Nakashima, Kashihara; Muneomi Katayama, Tokyo, both of Japan

[73] Assignee: Midori Katayama, Tokyo, Japan

[21] Appl. No.: 854,093

[22] Filed: Mar. 19, 1992

[51] Int. Cl.$^5$ .............................................. H04N 5/76
[52] U.S. Cl. ..................................... 358/335; 364/410
[58] Field of Search ...................... 358/335, 906, 909; 364/410, 578; 434/247, 252

[56] References Cited

U.S. PATENT DOCUMENTS 4,005,261 1/1977 Sato et al. ............................. 358/83
5,184,295 2/1993 Mann ................................... 364/410

*Primary Examiner*—Tommy P. Chin
*Assistant Examiner*—Robert Chevalier
*Attorney, Agent, or Firm*—Oblon, Spivak, McClelland, Maier & Neustadt

[57] ABSTRACT

A method and apparatus for producing an instructional video from a videotape of a golfer swinging a golf club. A computer still picture output section converts the video into still pictures, which are output onto a display. A correction picture output section generates video images of a desired swing motion corresponding to each of the still images. The still pictures of a golfer being analyzed are overlaid over the corrected images, which include lines depicting proper form. Additional visual and audio information can be added, and the result is recorded onto another videotape.

20 Claims, 4 Drawing Sheets

METHOD AND APPARATUS FOR PRODUCING AN INSTRUCTIONAL VIDEO ANALYZING A GOLF SWING

BACKGROUND OF THE INVENTION

1. Field of the Invention

The present invention relates to an apparatus for enhancing the instructional value of a videotape by superimposing images over one another and by adding visual and/or audio information to a resultant video tape.

2. Discussion of Background

It is said that form is everything in the sport of golfing, and that all will be good if correct form is used in making the golf swing. In analyzing a golfer's golf swing, it is useful to offer critique of the golfer from the side when addressing the ball, from both the side and from the front when the golfer has the golf club at the top of the backswing, and from the side as the golf club impacts the ball.

In a side view of the stance of the golfer addressing the ball, a correct posture may be defined by an angle formed between the club shaft and a line connecting the top of the golfer's shoulder with the club head. The angle should preferably be between 10° and 25°, although it depends to some degree upon the length of the club shaft and other variables.

In a side view of the golfer with the club head at the top of the backswing, a correct posture may be defined by a triangle drawn between the golfer's hands (gripped on the club shaft) and the golfer's elbows. The apex of the triangle is formed by the gripped hands, and the base of the triangle extends between the elbows. When correct form is used, the triangle is an equilateral triangle with a horizontal base.

In a front view of the golfer having the club head at the top of the backswing, the golfer's form is correct if a line drawn around the golfer's shoulders forms an ellipse lying horizontally and in parallel with an ellipse formed by a line drawn around the golfer's knees. Preferably, the ellipses align with one another, such that they can be connected by a pair of tangential lines which are parallel to one another, thereby forming a regular cylindrical shape.

In a side view of the golfer during impact of the golf ball, the correct form may be determined by analyzing a first line extending along the club shaft from the club head through the shoulders of the golfer, and a second line connecting the back sirloin and protruding right knee of the golfer. When correct form is used, the lines are substantially parallel to one another, although it is also acceptable if the angle is between about 10° and about 25°.

Even when a golfer knows the desired posture at every phase of the swing motion, the golfer is generally unable to properly assess and adjust his or her posture. The underlying reason is that the golfer is unable to see his or her own form. Furthermore, even if the golfer's performance is videotaped and replayed, the golfer may not be able to tell whether or not his/her posture is correct in the video.

SUMMARY OF THE INVENTION

Accordingly, one object of this invention is to provide a novel method and apparatus for allowing a golfer to compare his/her form with a correct form modeling that of a professional golfer or golf tutor.

The apparatus according to the invention includes a device for converting recorded video images of the golfer's swing into a plurality of still images of the golfer. A first still image shows the golfer addressing the ball before he/she begins the swing motion. A second still image shows the golfer from the side in the phase as he/she has the club at the top of the backswing, and a third still image shows the golfer from the front as he/she has the club at the top of the backswing. A fourth still image shows the golfer from the side as he/she is impacting the ball. The still images are produced by a computer still picture output section, which outputs the uncorrected video images onto a display. The apparatus further includes a correction picture output section for outputting a correction picture corresponding to each of the four uncorrected video images. For the first still image, a side view correction file means displays a line connecting the golfer's shoulder top and the club head and establishing at a substantially correct degree and angle defined by the golfer's club shaft in the address phase relative to the connecting line. For the second still image, a backswing side view correction file means establishes as a substantially correct triangle a triangle defined by the golfer's gripping hands to the club handle and the golfer's elbows at the top of the backswing. For the third still image, a backswing front view correction file means displays a first ellipse with a long axis formed by a line connecting the golfer's elbows at the top of the backswing and a second ellipse with a short axis formed by a line connecting the golfer's knees and establishing as a substantially correct cylinder a cylinder defined by a pair of parallel lines perpendicularly connecting the first and second ellipses. An overlying means is provided for overlying the output signals derived from the still picture output section with those produced by the correction picture output section. A device for adding characters and other visual information to the overlaid picture, a device for recording the resultant picture onto a videotape, and a device for adding voice to the videotape can also be provided.

The method according to the invention begins by videotaping a golfer executing a golf swing. The golfer is videotaped from both the front and from the side so that both front view and side view still images can be derived. A computer is used to derive the still images, a side view image of the golfer addressing the ball being derived first. An address phase correction picture is overlaid on the still picture, and suitable visual and/or audio instructions are added to the tape. Next, the computer is used to derive a still image showing the golfer from the side with the club at the top of the backswing. A backswing side view correction picture is overlaid on the still image, and additional suitable visual and/or audio instructional information is added. The steps are repeated for a front view of the backswing and a side view of the golfer impacting the ball.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3-1 is a side view showing the golfer's address phase;

FIG. 3-2 is a side view showing the golfer with the club at the top of the backswing;

FIG. 3-3 is a front view showing the golfer with the club at the top of the backswing; and FIG. 3-4 is a side view showing the golfer impacting the ball with the club.

DESCRIPTION OF THE PREFERRED EMBODIMENTS

Figure 1:
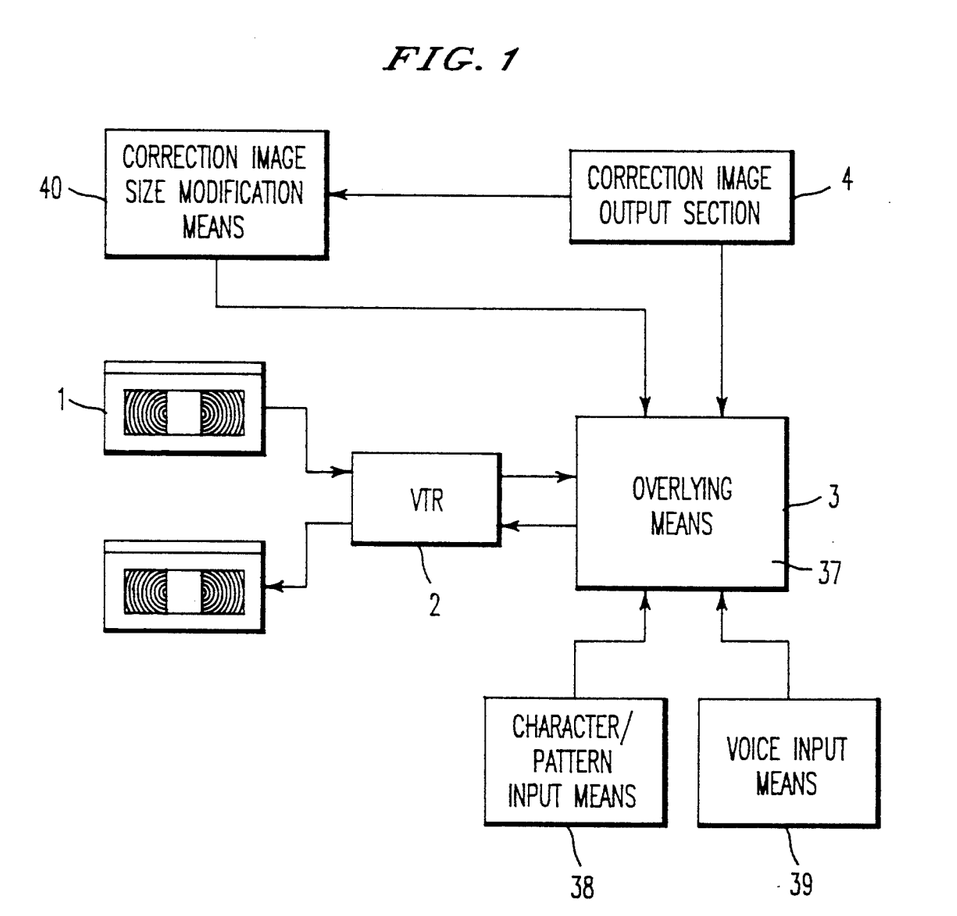
FIG. 1 is a block diagram showing an apparatus according to the invention.

Referring now to the drawings, wherein like reference numerals designate identical or corresponding parts throughout the several views, and more particularly to FIG. 1 thereof, reference numeral 1 designates a non-corrected videotape having recorded therein at least the four view depicted in FIGS. 3-1, 3-2, 3-3 and 3-4, respectively.

The embodiment illustrated is directed to a right-handed golfer. An embodiment for a left-handed golfer will be apparent from the following description.

There is a commercially available videotape recorder (VTR) 2, such as NEC's PV-S96 COMBOY, compatible to a personal computer 3 which is also commercially available and is capable of deriving a still picture from non-corrected videotape through VTR 2 on its display screen. It may be NEC's PC-9801DA. The swing phase views as shown in FIGS. 3-1, 3-2, 3-3 and 3-4 can therefore be obtained in the form of still pictures in an obvious way through the use of such equipment.

Reference numeral 4 designates a correction image output section (a group of files) developed by the inventors. Reference numeral 5 represents an image of a correction address side view file as shown in FIG. 3-1 where a golfer's corresponding view is contained in an overlying relationship (this is also true with respect to other files, to be described later). The image 5 includes a line 6 connecting the golfer's shoulder top and the club head to define a correct angle α at about 15° relative to a line 7 coextensive with the club shaft.

A line 8 extending through the golfer's club grip and parallel with the line 6 may form in combination with the line 6 a space area wherein the club should be positioned at the club head top of the backswing.

Reference numeral 10 designates a club head-top side view correction file shown in FIG. 3-2 wherein a line 13 extends from the club grip hands 11 toward the golfer's left shoulder 12, and a swing axial line 14 is drawn substantially perpendicularly to the line 13. A line 16 extends in parallel with the swing axial line 14 and perpendicularly to the line 13. The lines 13 and 16 and a line 18 connecting the opposite elbows 15 and 17 should critically form a triangle with the bottom side extending horizontally.

Reference numeral 20 designates a club head-top front view correction file wherein ellipse 23 is formed with a long axis defined by a width spacing between the opposed shoulders 21 and 22 and second ellipse 26 is displayed with a long axis defined by a spacing between the opposed knees 24 and 25. The ellipse should be connected by a pair of perpendicular parallel lines 27 and 28, thus critically forming the shape of a right cylinder 29.

Reference numeral 30 designates an impact side view correction file wherein a line 33 extending from the left shoulder 31 along with the club shaft to the club head 32 and a line 36 connecting the top end 34 of the sirloin and the protruding knee 35 both should lie in parallel and incline at a correct angle.

Reference numeral 37 represents an apparatus for overlying the output signals of the above-described still pictures onto the output signals of the respective correction image files. This apparatus may be part of the personal computer 3.

Reference numeral 38 represents an apparatus for inputting visual images or characters whose details are omitted from the illustration. The visual or character input means 38 is commercially available, for instance, DX (LKP-1200) and AP item input sheet from Laurel Bank Machine K.K., a Japanese corporation.

Reference number 39 refers to an apparatus for adding sound to the overlaid views. The sound can, for example, be a voice providing instruction and criticism. The details of this apparatus are also omitted from the illustration. It has a memory video reproduction apparatus for inputting voices from a microphone to the corrected video images or a device for inputting voices simultaneously with the correction step.

The overlaid views may be recorded back to a tape by the VTR 2 or by another separately provided VTR.

Reference numeral 40 represents a size modification means which is interposed between the correction image output section 4 and the overlying operation computer 3. Size modification means 40 modifies the sizes of the correction images to appropriately match the sizes of the uncorrected still images.

The use of the present invention will now be described with reference to the drawings. In use, a golfer who wants to be aided in correcting the form of his/her golf swing will provide a videotape with his or her swing form recorded thereon. The tape should include at least the address phase side view, the club head-top phase side view and front view, and the impact phase side view as depicted in FIGS. 3-1, 3-2, 3-3 and 3-4, respectively.

Figure 2:
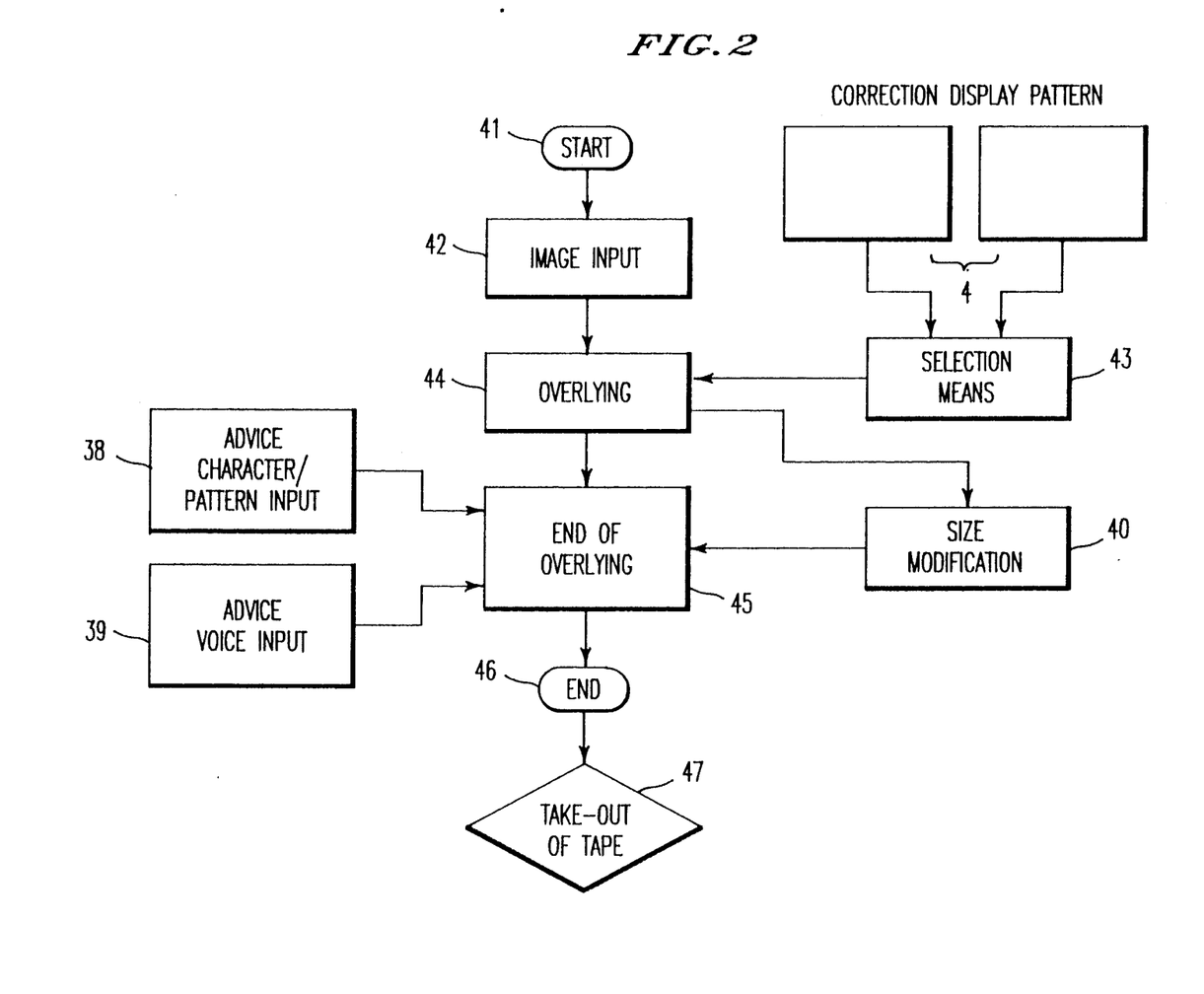
FIG. 2 is a block diagram showing a method according to the invention.
Figure 3A:
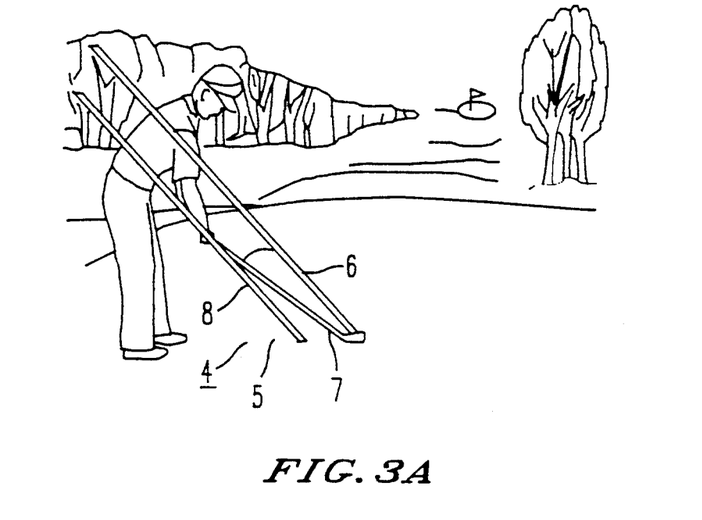
Figure 3B:
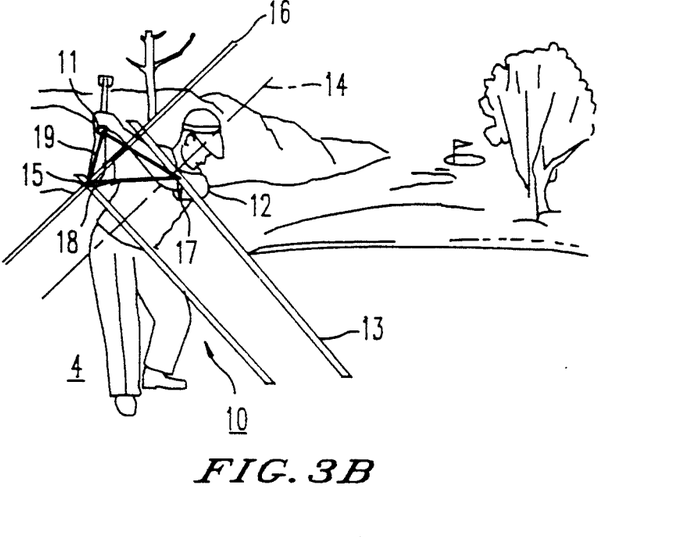
Figure 3C:
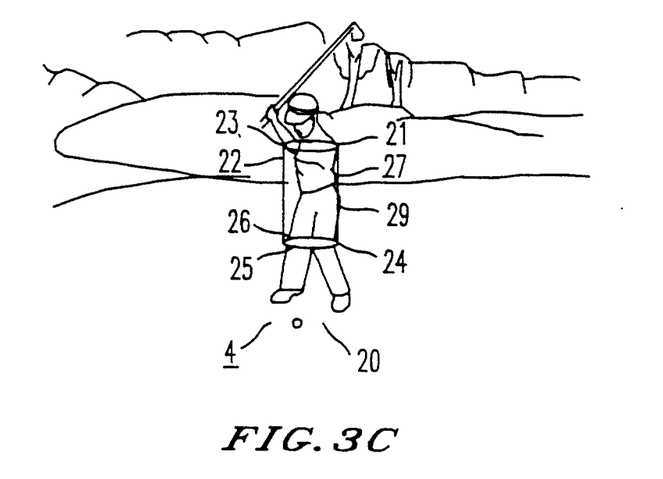
Figure 3D:
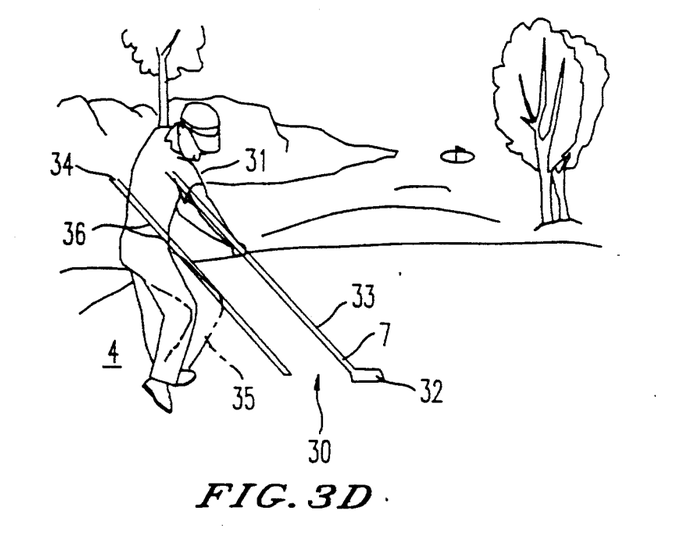

A non-corrected video film is started to run as shown at 41 in FIG. 2. The image from the video film is input to the computer 3 as shown at 42. A still picture of the address phase side view is derived therefrom. The corresponding file 5 of the address phase side view is outputted from the correction image output section 4 selectively by selection means 43 and put into an overlying relationship with the still picture in the overlying step 44.

The file 5 contains the line 6 connecting the left shoulder and the club head, which permits determination by a correcting advisor whether the club shaft viewed in the still picture extends in a substantially correct angle or between about 10° and about 20° relative to the line 7. If it lies correctly, the advisor can make a character indication, "You are at the correct address posture." This can be done by means 38 which may be a writing pen or a mouse or some other suitable input means. The indication may also be oral by means of the voice input apparatus 39.

If the club shaft is out of the correct angular range, the advisor may make an indication, "You are not at the correct address posture." After analysis, the advisor will make a suitable suggestion for the correction, for instance, that the club grip be lowered by visual means like a downward arrow and/or by an oral indication.

A still picture showing a side view of the club head-top swing posture is overlaid on the club head-top correction side view file 10 which contains a triangle 19 formed with a bottom side extending horizontally by a line 13 extending from the club grip hands 11 toward the left shoulder 12, a line 16 extending in parallel with the swing axial line 14 on the right elbow 15 and a line 18 connecting the opposed elbows 15 and 17, which facilitates the corresponding corrective determination and advising in a similar manner.

A still picture is then derived from the front view of the club head-top swing posture and it is overlaid on the club head-top correction front view file 20. File 20 contains a substantially correct cylinder 29, which is formed by a pair of ellipses 23 and 26 with long axes formed by a space between the opposed shoulders 21 and 22 and by a long space between the opposed knees 24 and 25. A pair of perpendicular parallel lines 27 and 28 connect the ellipses, thus facilitating the corrective determination and the advising operation.

A still picture is derived from the impact side view, and it is overlaid on the correction file 30. Correction file 30 contains a pair of lines 33 extending from the left shoulder 31 along the club shaft 7 to the head 32 and connecting the top end of the central sirloin 34 and the tip of the protruding right knee 35, the lines lying correctly in parallel with each other and in a correct inclination angle. This facilitates the corresponding corrective determination and the advising operation.

In the event that a non-corrective video image is different in size from the displays from the correction image output section, a size adjustment means 40 between the correction image output section 4 and the overlying computer 3 may be operated to modify the size of the files of the correction image output section to match the size of the non-corrected video image.

After the step 45 of correction determination and corrective advice, the resultant images are recorded back to videotape at 46 which will be taken out at 47 and provided to the golfer who needs corrective instructions.

Thus, according to the present invention, a golfer who wants to rectify his or her form of swing motion need only to have the latter recorded on a videotape showing the address phase in the side view, the backswing club head-top phase in both the side and front view, and the impact phase in the side view. These views are then derived as still images which are overlaid onto arrangements of lines which indicate a desired form which models the form of a professional golfer, for example.

After the golfer's image has been derived as a still picture on a computer CRT screen, and after the still picture is overlaid on a correction view image, the correctness of the golfer's form can easily be determined. After determination, a golfer can make corrective practices by keeping in mind the discrepancies noted in the video. After additional practice, he or she can take additional video recordings, and treat them according to the invention until he or she acquires the desired form of swing.

Although a limited number of views of the golfer are discussed above, various other views of the golfer's swing could be analyzed. For example, a finish phase wherein the golfer has the arms folded.

In the foregoing description, the correction image files have the linear input indicators preliminarily recorded in the correction image output section. However, they can be written directly in the view of the respective images recorded in a videotape. The present invention is also intended to cover this modification.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An apparatus for producing an instructional video from a videotape of a golfer swinging a golf club, comprising:
   means for converting video images from a videotape of a golfer's swing into a plurality of still images representing predetermined phases of the golfer's swing;
   a display screen for displaying said still images;
   a correction picture output section for outputting a video image corresponding to each of said still images, each said correction picture comprising an arrangement of lines, said arrangement of lines corresponding to geometric relationships between at least two reference points, wherein said at least two reference points include a first body part of said golfer and at least one of: a second body part of the golfer which is not immediately adjacent said first body part, and a part of the golf club which is not immediately adjacent said first body part;
   and further wherein said arrangement of lines includes one of: a straight line directly connecting said two reference points, and an ellipse having an axis defined by a spacing between aid two reference points;
   overlying means for overlying each of said still images over its corresponding correction picture to produce a resultant picture; and
   means for recording said resultant picture;
   wherein one of said still images is a side view of the golfer addressing a golf ball, with the corresponding correction picture including a line directly connecting a shoulder position of the golfer with a club head position.

2. The apparatus of claim 1, further comprising means for adding visual instructional information to said resultant picture.

3. The apparatus of claim 1, further comprising means for recording audio instructional information onto said videotape.

4. The apparatus of claim 1, wherein said line connecting the shoulder position of the golfer with the club head position makes an angle with a club shaft of 10 to 20 degrees.

5. The apparatus of claim 1, further comprising means for adjusting a size of each correction picture to match a size of its corresponding still image.

6. An apparatus for producing an instructional video from a videotape of a golfer swinging a golf club, comprising:
   means for converting video images from a videotape of a golfer's swing into a plurality of still images representing predetermined phases of the golfer's swing;
   a display screen for displaying said still images;
   a correction picture output section for outputting a video image corresponding to each of said still images, each said correction picture comprising an arrangement of lines, said arrangement of lines corresponding to geometric relationships between at least two reference points, wherein said at least two reference points include a first body part of said golfer and at least one of: a second body part of the golfer which is not immediately adjacent said first body part, and a part of the golf club which is not immediately adjacent said first body part;

and further wherein said arrangement of lines includes one of: a straight line directly connecting said two reference points, and an ellipse having an axis defined by a spacing between said two reference points;

overlying means for overlying each of said still images over its corresponding correction picture to produce a resultant picture; and means for recording said resultant picture;

wherein one of said still images is a side view of the golfer with a club head at a top position of a backswing, the corresponding correction picture including a first line extending directly from a golfer's gripped hands position toward a shoulder position, a swing axial line drawn substantially perpendicular to said first line, a second line extending in parallel with said swing axial line, and a third line directly connecting elbow positions of the golfer.

7. The apparatus of claim 6, further comprising a triangle having an apex defined by the golfer's gripped hands position and a base defined by the elbow positions, with the base of said triangle being parallel to a ground surface.

8. An apparatus for producing an instructional video from a videotape of a golfer swinging a golf club, comprising:

means for converting video images from a videotape of a golfer's swing into a plurality of still images representing predetermined phases of the golfer's swing;

a display screen for displaying said still images;

a correction picture output section for outputting a video image corresponding to each of said still images, each said correction picture comprising an arrangement of lines, said arrangement of lines corresponding to geometric relationships between at least two reference points, wherein said at least two reference points include a first body part of said golfer and at least one of: a second body part of the golfer which is not immediately adjacent said first body part, and a part of the golf club which is not immediately adjacent said first body part;

and further wherein said arrangement of lines includes one of: a straight line directly connecting said two reference points, and an ellipse having an axis defined by a spacing between said two reference points;

overlying means for overlying each of said still images over its corresponding correcting picture to produce a resultant picture; and means for recording said resultant picture;

wherein one of said still images is a front view of the golfer with the club head at a top position of a backswing, the corresponding correction picture including an upper ellipse formed with a long axis defined by a width spacing between opposed elbow positions of the golfer, a lower ellipse displayed with a long axis defined by a spacing between opposed knee positions of the golfer, and first and second parallel lines joining said upper ellipse with said lower ellipse.

9. The apparatus of claim 8, wherein said first and second parallel lines extend perpendicularly to said ellipses, thereby forming a cylinder with a longitudinal axis extending perpendicularly to a ground surface.

10. An apparatus for producing an instructional video from a videotape of a golfer swinging a golf club, comprising:

means for converting video images from a videotape of a golfer's swing into a plurality of still images representing predetermined phases of the golfer's swing;

a display screen for displaying said still images;

a correction picture output section for outputting a video image corresponding to each of said still images, each said correction picture comprising an arrangement of lines, said arrangement of lines corresponding to geometric relationships between at least two reference points, wherein said at least two reference points include a first body part of said golfer and at least one of: a second body part of the golfer which is not immediately adjacent said first body part, and a part of the golf club which is not immediately adjacent said first body part;

and further wherein said arrangement of lines includes one of: a straight line directly connecting said two reference points, and an ellipse having an axis defined by a spacing between said two reference points;

overlying means for overlying each of said still images over its corresponding correction picture to produce a resultant picture; and means for recording said resultant picture;

wherein one of said still images is a side view of the golfer impacting a golf ball with the club, the corresponding correction picture including a first line directly extending from a shoulder position to a club head position and a second line directly connecting a top end of a sirloin position of the golfer with a protruding knee position.

11. The apparatus of claim 10, wherein said first and second lines are parallel to one another.

12. A method of analyzing a golfer's swing motion, comprising the steps of:

video taping a golfer's stance and swing;

converting video images of the golfer to a plurality of still images on a computer display screen;

generating a correction picture corresponding to each of said still images, each said correction picture comprising an arrangement of lines, said arrangement of lines corresponding to geometric relationships between at least two reference points, with said at least two reference points including a first body part of said golfer and at least one of: a second body part of the golfer which is not immediately adjacent said first body part, and a part of a golf club which is not immediately adjacent said first body part;

and further wherein said step of providing a correction picture with an arrangement of lines includes providing one of a straight line directly connecting said two reference points, and an ellipse having an axis defined by a spacing between said two reference points;

overlying each of said still images over its corresponding correction picture to form a resultant picture; and recording the resultant picture;

wherein one of said still images is a side view of the golfer addressing a golf ball, and wherein the correction picture corresponding to said view includes a line directly connecting a shoulder position of the golfer with a club head position.

13. The method of analyzing a golfer's swing motion according to claim 12, further comprising the step of:
recording a suitable visual message onto the resultant picture.

14. The method of analyzing a golfer's swing motion according to claim 12, further comprising the step of:
recording a suitable audio message onto said videotape along with the resultant picture.

15. The method of analyzing a golfer's swing motion according to claim 12, further comprising a step of adjusting a size of each of said correction pictures to match a size of its corresponding still image.

16. A method of analyzing a golfer's swing motion, comprising the steps of:
video taping a golfer's stance and swing;
converting video images of the golfer to a plurality of still images on a computer display screen;
generating a correction picture corresponding to each of said still images, each said correction picture comprising an arrangement of lines, said arrangement of lines corresponding to geometric relationships between at least two reference points, with said at least two reference points including a first body part of said golfer and at least one of: a second body part of the golfer which is not immediately adjacent said first body part, and a part of a golf club which is not immediately adjacent said first body part;
and further wherein said step of providing a correction picture with an arrangement of lines includes providing one of a straight line directly connecting said two reference points, and an ellipse having an axis defined by a spacing between said two reference points;
overlying each of said still images over its corresponding correction picture to form a resultant picture; and
recording the resultant picture;
wherein one of said still images is a side view of the golfer addressing a golf ball, and wherein the correction picture corresponding to said view includes a line directly connecting a shoulder position of the golfer with a club head position, further comprising the step of:
determining whether or not said line forms an angle between 10 and 20 degrees with the club shaft.

17. A method of analyzing a golfer's swing motion, comprising the steps of:
video taping a golfer's stance and swing;
converting video images of the golfer to a plurality of still images on a computer display screen;
generating a correction picture corresponding to each of said still images, each said correction picture comprising an arrangement of lines, said arrangement of lines corresponding to geometric relationships between at least two reference points, with said at least two reference points including a first body part of said golfer and at least one of: a second body part of the golfer which is not immediately adjacent said first body part, and a part of a golf club which is not immediately adjacent said first body part;
and further wherein said step of providing a correction picture with an arrangement of lines includes providing one of a straight line directly connecting said two reference points, and an ellipse having an axis defined by a spacing between said two reference points;
overlying each of said still images over its corresponding correction picture to form a resultant picture; and
recording the resultant picture;
wherein one of said still images is a side view of the golfer with a club head at a top position of a backswing, the corresponding correction picture including a triangle having an apex defined by a golfer's hands position and a base defined by a line joining a golfer's elbow positions.

18. A method of analyzing a golfer's swing motion, comprising the steps of:
video taping a golfer's stance and swing;
converting video images of the golfer to a plurality of still images on a computer display screen;
generating a correction picture corresponding to each of said still images, each said correction picture comprising an arrangement of lines, said arrangement of lines corresponding to geometric relationships between at least two reference points, with said at least two reference points including a first body part of said golfer and at least one of: a second body part of the golfer which is not immediately adjacent said first body part, and part of a golf club which is not immediately adjacent said first body part;
and further wherein said step of providing a correction picture with an arrangement of lines includes providing one of a straight line directly connecting said two reference points, and an ellipse having an axis defined by a spacing between said two reference points;
overlying each of said still images over its corresponding correction picture to form a resultant picture; and
recording the resultant picture;
wherein one of said still images is a front view of the golfer with a club head at a top position of a backswing, said corresponding correction picture including an upper ellipse formed with a long axis defined by a width spacing between opposed elbow positions of the golfer, a lower ellipse displayed with a long axis defined by a spacing between opposed knee positions of the golfer, and first and second parallel lines joining said upper ellipse with said lower ellipse.

19. A method of analyzing a golfer's swing motion, comprising the steps of:
video taping a golfer's stance and swing;
converting video images of the golfer to a plurality of still images on a computer display screen;
generating a correction picture corresponding to each of said still images, each said correction picture comprising an arrangement of lines, said arrangement of lines corresponding to geometric relationships between at least two reference points, with said at least two reference points including a first body part of said golfer and at least one of: a second body part of the golfer which is not immediately adjacent said first body part, and a part of a golf club which is not immediately adjacent said first body part;
and further wherein said step of providing a correction picture with an arrangement of lines includes providing one of a straight line directly connecting said two reference points, and an ellipse having an axis defined by a spacing between said two reference points;

overlying each of said still images over its corresponding correction picture to form a resultant picture; and recording the resultant picture;

wherein one of said still images is a side view of the golfer impacting a golf ball with a club, the corresponding correction picture including a first line directly extending from a shoulder position to a club head position and a second line directly connecting a top end of a sirloin position of the golfer with a protruding knee position.

20. An apparatus for producing an instructional video from a videotape of a golfer swinging a golf club, comprising:

means for converting video images from a videotape of a golfer's swing into a plurality of still images representing predetermined phases of the golfer's swing;

a display screen for displaying said still images;

a correction picture output section for outputting a video image corresponding to each of said still images, each said correction picture comprising an arrangement of lines;

overlying means for overlying each of said still images over its corresponding correction picture to produce a resultant picture; and means for recording said resultant picture;

wherein said arrangement of lines includes:

(a) a line directly connecting a shoulder position of the golfer with a club head position;

(b) a first line extending directly from a golfer's gripped hands position to a first elbow position, a second line extending directly from the gripped hands position to a second elbow position, and a third line directly connecting said first and second elbow positions of the golfer;

(c) an upper ellipse formed with a long axis defined by a width spacing between opposed elbow positions of the golfer, and a lower ellipse displayed with a long axis defined by a spacing between opposed knee positions of the golfer, and first and second parallel lines joining said upper ellipse with said lower ellipse; and (d) a fourth line directly extending from a left shoulder position to the club head position and a fifth line directly connecting a top end of a sirloin position of the golfer with a protruding knee position.

* * * * *